United States Patent
Nyman et al.

(10) Patent No.: US 9,010,548 B2
(45) Date of Patent: Apr. 21, 2015

(54) METHOD AND ARRANGEMENT FOR SEPARATING TWO SOLUTIONS MIXED IN DISPERSION INTO TWO SOLUTION PHASES IN A LIQUID-LIQUID EXTRACTION SEPARATION CELL

(75) Inventors: Bror Nyman, Vanha-Ulvila (FI); Eero Ekman, Pori (FI); Pertti Pekkala, Espoo (FI); Hannu Laitala, Espoo (FI); Rami Saario, Espoo (FI)

(73) Assignee: Outotec Oyj, Espoo (FI)

( * ) Notice: Subject to any disclaimer, the term of this patent is extended or adjusted under 35 U.S.C. 154(b) by 330 days.

(21) Appl. No.: 13/145,334

(22) PCT Filed: Feb. 5, 2010

(86) PCT No.: PCT/FI2010/050070
§ 371 (c)(1),
(2), (4) Date: Jul. 19, 2011

(87) PCT Pub. No.: WO2010/089456
PCT Pub. Date: Aug. 12, 2010

(65) Prior Publication Data
US 2011/0284462 A1    Nov. 24, 2011

(30) Foreign Application Priority Data
Feb. 9, 2009 (FI) .................................. 20095122

(51) Int. Cl.
*B01D 17/028* (2006.01)
*B01D 11/04* (2006.01)
(Continued)

(52) U.S. Cl.
CPC ........ *B01D 11/0453* (2013.01); *B01D 17/0214* (2013.01); *C22B 3/0005* (2013.01); *C22B 3/02* (2013.01)

(58) Field of Classification Search
CPC ........... B01D 11/0453; B01D 17/0214; B01D 17/0211
See application file for complete search history.

(56) References Cited

U.S. PATENT DOCUMENTS

| 4,123,365 A | 10/1978 | Middelbeek |
| 4,132,652 A | 1/1979 | Anderson et al. |

(Continued)

FOREIGN PATENT DOCUMENTS

| WO | 9404464 A1 | 3/1994 |
| WO | 03097207 A1 | 11/2003 |

(Continued)

OTHER PUBLICATIONS

Nellis et al. Heat Transfer, E23: Chapter 9 Mass transfer, pp. E23-1-E23-2, Available at <http://www.cambridge.org/us/engineering/author/nellisandklein/>, accessed Apr. 14, 2014.*

(Continued)

*Primary Examiner* — Katherine Zalasky
(74) *Attorney, Agent, or Firm* — Chernoff, Vilhauer, McClung & Stenzel, LLP

(57) ABSTRACT

A method and arrangement for separating two solutions mixed in dispersion into two solution phases in a liquid-liquid extraction separation cell. A lighter solution phase placed on the heavier solution phase is forced to flow as a thin overflow layer over the top edge of a front panel such that the dispersion thickens A rear panel is essentially parallel with the front panel so that in between the front panel and the rear panel, there is formed an uptake shaft along which the thickened dispersion can rise and be compressed.

13 Claims, 4 Drawing Sheets

Figure 1:
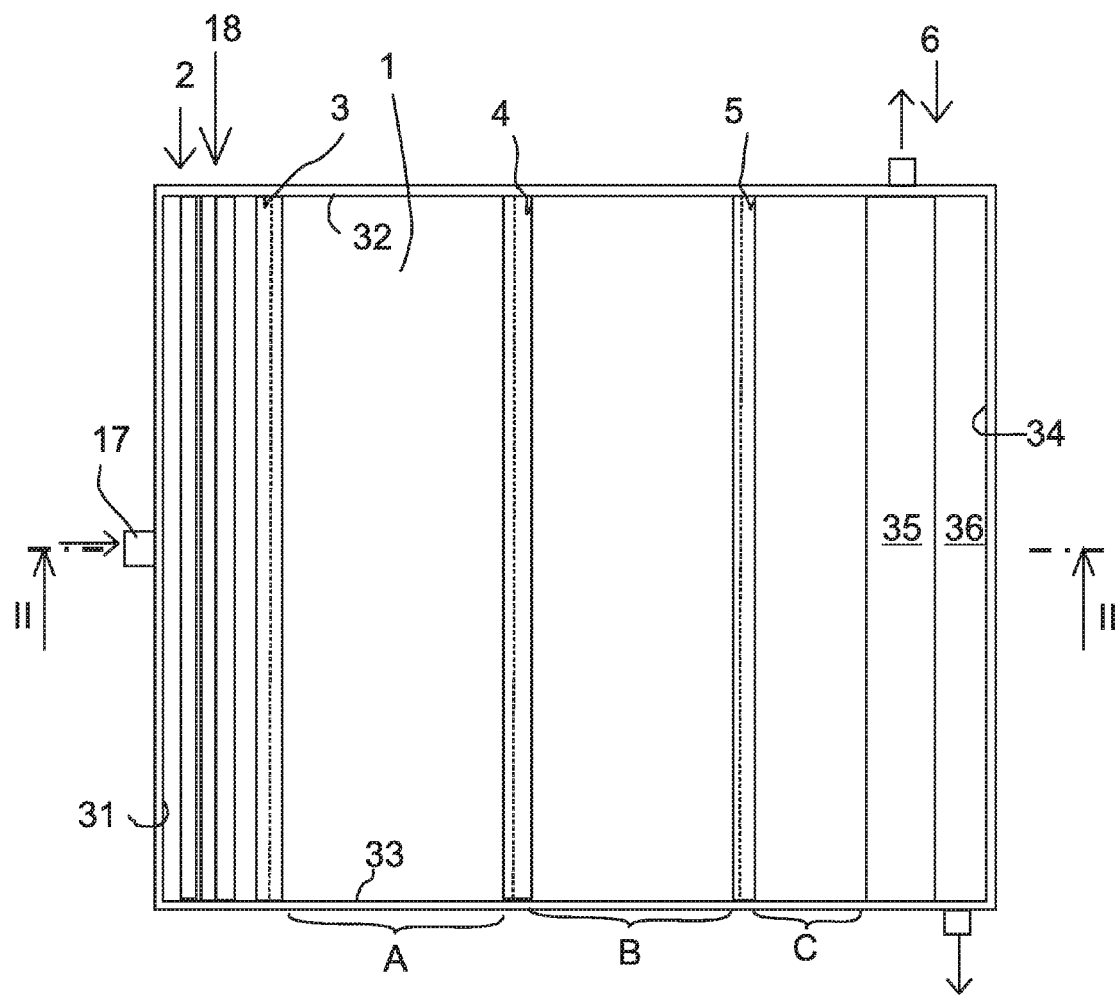

(51) Int. Cl.
*B01D 17/02* (2006.01)
*C22B 3/26* (2006.01)
*B01D 17/04* (2006.01)
*C22B 3/02* (2006.01)

(56) References Cited

U.S. PATENT DOCUMENTS

| | | | |
|---|---|---|---|
| 6,132,615 | A | 10/2000 | Nyman |
| 6,176,608 | B1 | 1/2001 | Nyman |
| 7,390,420 | B2 | 6/2008 | Nyman |
| 7,465,402 | B2 | 12/2008 | Nyman |
| 7,517,461 | B2 | 4/2009 | Nyman |
| 7,704,398 | B2 | 4/2010 | Pekkala |
| 2005/0040106 | A1 | 2/2005 | Gigas et al. |
| 2005/0224410 | A1* | 10/2005 | Nyman et al. ............... 210/634 |
| 2006/0157405 | A1 | 7/2006 | Thacker et al. |
| 2007/0029254 | A1 | 2/2007 | Nyman |
| 2007/0210000 | A1* | 9/2007 | Pekkala et al. ............... 210/634 |

FOREIGN PATENT DOCUMENTS

| | | |
|---|---|---|
| WO | 2004082798 A1 | 9/2004 |
| WO | 2005120676 A1 | 12/2005 |

OTHER PUBLICATIONS

Qi Junqing, et al, "Feed Throughput Related to the Inclined Plate Distance," Journal of Zhen Gzhou Institute of Light Industry, vol. 14, No. 4, Dec. 1999, 5 pages.
Chinese Office Action for Chinese Patent Application No. 201080007231.5, issued May 24, 2013, 33 pages.
Jukka Taskinen, International Search Report for PCT/FI2010/050070, Mar. 9, 2010.
Supplementary European Search Report, EP App. No. 10 73 8245, Outotec Oyj, dated Sep. 13, 2013, 3 pgs.

* cited by examiner

METHOD AND ARRANGEMENT FOR SEPARATING TWO SOLUTIONS MIXED IN DISPERSION INTO TWO SOLUTION PHASES IN A LIQUID-LIQUID EXTRACTION SEPARATION CELL

This is a national stage application filed under 35 USC 371 based on International Application No. PCT/FI2010/050070 filed Feb. 5, 2010, and claims priority under 35 USC 119 of Finnish Patent Application No. 20095122 filed Feb. 9, 2009.

FIELD OF INVENTION

The invention relates to a method defined in the preamble of claim 1. The invention also relates to an arrangement defined in the preamble of claim 15.

BACKGROUND OF INVENTION

In the prior art, there is known, for example from the patent publications FI101200 B, FI 101199 B, FI 112039B, FI 112328 B and FI 113244 B, various methods and arrangements for separating two solutions mixed in dispersion into two solution phases in a liquid-liquid extraction separation cell. A first solution and a second solution, which is heavier than the first solution, can be separated from the dispersion of said solutions. Generally the cell arrangement includes side walls and a bottom, inside which there is defined a separation space. The cell has a feed end, through which the dispersion is fed into the cell, and distributed, by some suitable arrangement, evenly along the whole width of the cell. At the cell drain end, the first and second solutions are arranged to be removed as mutually separated. In between the feed and drain ends, the cell is provided with shut-off elements, by which the flow of the separating solution phases and dispersion is controlled; in between said shut-off elements, there are created successive separation steps, where the lighter first solution (generally an organic phase) is separated as an upper solution phase, and the second solution is separated below the upper solution phase as a lower solution phase (generally an aqueous solution). The cell drain end is provided with an overflow chute, which is positioned transversally with respect to the flowing direction, and receives the first solution separated into the upper phase as overflow from the cell, and the solution is drained from said overflow chute. In the flowing direction, in succession to the overflow chute and adjacently with it, there is provided a collecting chute for receiving the second solution as underflow from the cell. Riser pipes extend from the collecting chute to the cell, and through said riser pipes, the second solution can rise to the collecting chute, from which the second solution phase is drained.

A perpetual aim in liquid-liquid extraction separation is both to improve the feed-through capacity and to reduce mixing values, which aims have in practice been fairly contradictory. The term 'mixing value' here means the quantity of residual droplets from the other solution in the separated solution phase. When the capacity is increased, the mixing values tend to rise, because the liquid-liquid contact time is cut shorter. In the prior art, with a specific flow power of 4 . . . 6 $m^3/m^2h$, the object has been to achieve mixing values where the quantity of residual droplets from the organic matter in the aqueous solution phase (so-called "O/A entrainment") is within the range 5 . . . 10 ppm, and the quantity of residual droplets from water in the organic phase (so-called "A/O entrainment") is within the range 50 . . . 100 ppm.

OBJECT OF INVENTION

An object of the invention is to further improve known methods and arrangements and to make them more effective, so that the separation, quantity per unit of area of two solutions mixed in a dispersion is increased and the separation process is speeded up, the degree of separation is increased when measured as a decrease in residual droplets in both separated solutions, and the mass transfer reactions in the separating solution phases achieve a state near their equilibrium.

Further, an object of the invention is to introduce a method and arrangement, by which there are achieved thick and dense dispersion layers that proceed compressed to the successive separator part.

Moreover, an object of the invention is to introduce a method and arrangement that enable an extension in the liquid-liquid contact time and an improvement in the separation of the liquid phases, at the same time as the feed-through rate can be increased and the specific flow power can be raised.

SUMMARY OF INVENTION

The method according to the invention is characterized by what is set forth in claim 1. The arrangement according to the invention is characterized by what is set forth in claim 11.

In the method, dispersion is fed into a cell at the cell feed end, the supplied dispersion is distributed evenly along the whole width of the cell, the flow of the dispersion and the separating solution phases in the cell separation space is controlled by means of a shut-off element that extends along the whole width of the cell and divides the cell in the lengthwise direction into separator compartments, and the mutually separated solution phases are drained from the cell at the drain end.

According to the invention, in the method the heavier solution phase is allowed to flow unobstructed, directly forwards, in the shut-off element on the cell bottom; the lighter solution phase located on top of the heavier solution phase is prevented from proceeding directly and continuously; the lighter solution phase is forced to flow as an overflow current; a direct, continuous proceeding of the dispersion flow is prevented, and the dispersion is allowed to be accumulated essentially immovably as a thick layer; and the dispersion accumulated as a thick layer is forced to rise from the vicinity of the cell bottom upwards for compressing the dispersion; and the vertical component of the rising compressed dispersion flow is attenuated and slowed down and conducted essentially in the lengthwise direction of the cell to the successive separator part.

An arrangement according to the invention includes a feeder device for feeding the dispersion to the cell feed end, a flow distribution device, which is placed in the vicinity of the feed end for distributing the supplied dispersion evenly along the whole width of the cell, and a shut-off element, which divides the cell in the lengthwise direction into separator compartments.

According to the invention, the shut-off element comprises a front panel that extends along the whole width of the cell, said front panel including a bottom edge, which is arranged at a distance from the cell bottom so that the front panel allows an unobstructed flow of the heavier solution phase directly forwards underneath the bottom edge, said front panel extending in the vertical direction at such a height that it forces the lighter solution phase placed on top of the heavier solution phase to flow as a thin overflow layer over the top edge of the front panel, and forces the dispersion to thicken in front of the front panel. Further, the shut-off element includes a rear panel, which is essentially parallel with the front panel and placed at a distance therefrom, so that in between the front panel and the rear panel, there is formed an uptake shaft extending essentially vertically upwards at an inclined angle, along which uptake shaft the thickened dispersion can rise upwards and be compressed. In addition, the shut-off element includes at least one slanting plate, which is in the direction of the flow placed at an inclined angle, inclined diagonally upwards with respect to the horizontal plane, said slanting plate being arranged to attenuate and slow down the vertical component of the rising compressed dispersion flow and to conduct the dispersion as a dispersion flow proceeding essentially in the lengthwise direction of the cell to the successive separator part.

An advantage of the invention is that it further improves known methods and arrangements and makes them more effective, so that the separation quantity per unit of area of two solutions mixed in a dispersion is increased and the separation process is speeded up, the degree of separation is increased when measured as a decrease in residual droplets in both separated solutions, and the mass transfer reactions in the separating solution phases achieve a state near their equilibrium. By means of the invention, the specific flow power can be raised even up to the value $10 \ldots 30 \, m^3/m^2h$ with mixing values where the quantity of residual droplets from the organic matter in the aqueous solution phase (so-called "O/A entrainment") is of the order less than $2 \ldots 3$ ppm, and the quantity of residual droplets from water in the organic phase (so-called "A/O entrainment") is of the order $20 \ldots 30$ ppm.

Another advantage of the invention is that by means of it, there can be achieved dispersion layers that are accumulated as thick and compressed layers in front of the shut-off elements before proceeding compressed to the successive separator part.

Yet another advantage of the invention is that it enables an extension of the liquid-liquid contact time and improves the separation of the liquid phases, at the same time as the feed-through rate can be increased and the specific flow power can be raised.

In an embodiment of the method, the lighter solution phase conducted as an overflow is cleaned of the residues of the heavier solution phase.

In an embodiment of the method, part of the dispersion, together with the lighter solution phase, is conducted to flow as overflow to the cleaning step.

In an embodiment of the method, the quantity of dispersion to be conducted into the cleaning step is adjusted as overflow.

In an embodiment of the method, the heavier solution phase is allowed to flow unobstructed on the cell bottom, directly forwards underneath the bottom edge of the front panel.

In an embodiment of the method, the dispersion and/or the lighter solution phase placed on the heavier solution phase is prevented from proceeding directly and continuously in the lengthwise direction of the cell by means of a front panel extending along the cell width and by an adjusting gate, said adjusting gate being adjustable in the height position so that the top edge of the adjusting gate defines the overflow height.

In an embodiment of the method, the dispersion and/or the lighter solution phase placed on the heavier solution phase is prevented from proceeding directly and continuously in the lengthwise direction of the cell by means of a front panel extending along the cell width, so that the top edge of the front plate defines the overflow height.

In an embodiment of the method, the dispersion and/or the lighter solution phase is forced to flow forwards as an overflow current over the top edge of the front panel and/or over the top edge of the adjusting gate.

In an embodiment of the method, the lighter solution phase conducted as overflow is cleaned of the residues of the heavier solution phase by means of a sliced sheet separator, which receives the lighter solution phase as overflow.

In an embodiment of the method, the part of the dispersion conducted as overflow is cleaned of the residues of the heavier solution phase by means of a sliced sheet separator, which receives the dispersion as overflow.

In an embodiment of the method, a direct continuous proceeding of the dispersion flow is prevented by means of a front panel and/or an adjusting gate, in front of which the dispersion is allowed to be accumulated as a thick layer.

In an embodiment of the method, at least the major part of the dispersion accumulated as a thick layer in front of the front panel and/or the adjusting gate is conducted to proceed underneath the bottom edge of the front panel and to rise in the vicinity of the cell bottom upwards along an uptake shaft, which is formed in between the front panel and a rear panel extending at a distance from the front panel, as essentially parallel and along the cell width, for compressing the dispersion.

In an embodiment of the method, the vertical component of the rising compressed dispersion flow is attenuated and slowed down and conducted to proceed essentially in the lengthwise direction of the cell by means of slanting plates, which are in the direction of the flow placed upwardly at an inclined angle, and guided by which the dispersion flows to the successive separator part.

In an embodiment of the method, when the distance between the bottom edge of the front panel and the bottom is the first distance, the bottom edge of the rear panel is placed at a second distance from the bottom, said second distance being shorter than said first distance.

In an embodiment of the arrangement, the shut-off element includes a sliced sheet separator, which is arranged above the top edge of the front panel, to extend along the whole width of the cell, said sliced sheet separator being arranged to receive the lighter solution phase and/or dispersion conducted as overflow, in order to clean it/them.

In an embodiment of the arrangement, the sliced sheet separator includes a number of sliced sheets, which are arranged in the direction of the flow at an inclined angle, inclined diagonally upward with respect to the horizontal plane, and arranged one upon the other, at a short distance from each other, so that in between the sliced sheets, there are formed narrow laminar flow canals.

In an embodiment of the arrangement, the angle of inclination of the sliced sheets and/or slanting plates is $5 \ldots 30°$, preferably $10 \ldots 20°$.

In an embodiment of the arrangement, the distance between the sliced sheets is $3 \ldots 30$ mm.

In an embodiment of the arrangement, the arrangement includes one or several shut-off elements, preferably $2 \ldots 4$ shut-off elements that divide the cell in the lengthwise direction into separator compartments with varying lengths.

In an embodiment of the arrangement, the arrangement includes three shut-off elements, i.e. a first, second and third shut-off element.

In an embodiment of the arrangement, the distance between the sliced sheets in the first shut-off element is $15 \ldots 30$ mm, the distance between the sliced sheets in the second shut-off element is $10 \ldots 20$ mm, and the distance between sliced sheets in the third shut-off element is $3 \ldots 10$ mm.

In an embodiment of the arrangement, the vertical extension of the shut-off elements is reduced in the downstream direction of the flow.

In an embodiment of the arrangement, the vertical extension of the sliced sheet separator of the shut-off elements is reduced in the downstream direction of the flow.

In an embodiment of the arrangement, the height extension of the sliced sheet separator of the first shut-off element is 30 . . . 40% of the cell solution height, the height extension of the sliced sheet separator of the second shut-off element is 25 . . . 35% of the cell solution height, and the height extension of the sliced sheet separator of the third shut-off element is 15 . . . 25% of the cell solution height.

In an embodiment of the arrangement, the distance between the bottom edge of the front panel and the bottom being the first distance, the bottom edge of the rear panel is placed at a second distance from the bottom, said second distance being shorter than said first distance.

In an embodiment of the arrangement, in the first shut-off element the distance of the bottom edge of the front panel from the bottom is 15 . . . 25% of the cell solution height, in the second shut-off element the distance of the bottom edge of the front panel from the bottom is 30 . . . 40% of the cell solution height, and in the third shut-off element the distance of the bottom edge of the front panel from the bottom is 45 . . . 55% of the cell solution height.

In an embodiment of the arrangement, the front panel and the rear panel are essentially vertical.

In an embodiment of the arrangement, the width of the uptake shaft is arranged so that the dispersion quantity rising therein does not increase the flow rate for over 0.05 m/s . . . 0.10 m/s.

In an embodiment of the arrangement, the effective solution height in the cell is 1.5 . . . 2.5 m.

LIST OF DRAWINGS

Figure 2:
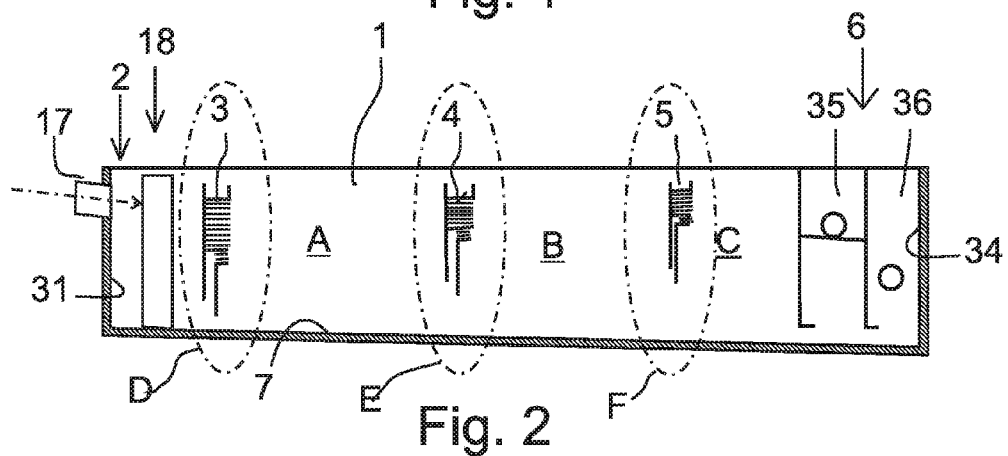
Figure 3:
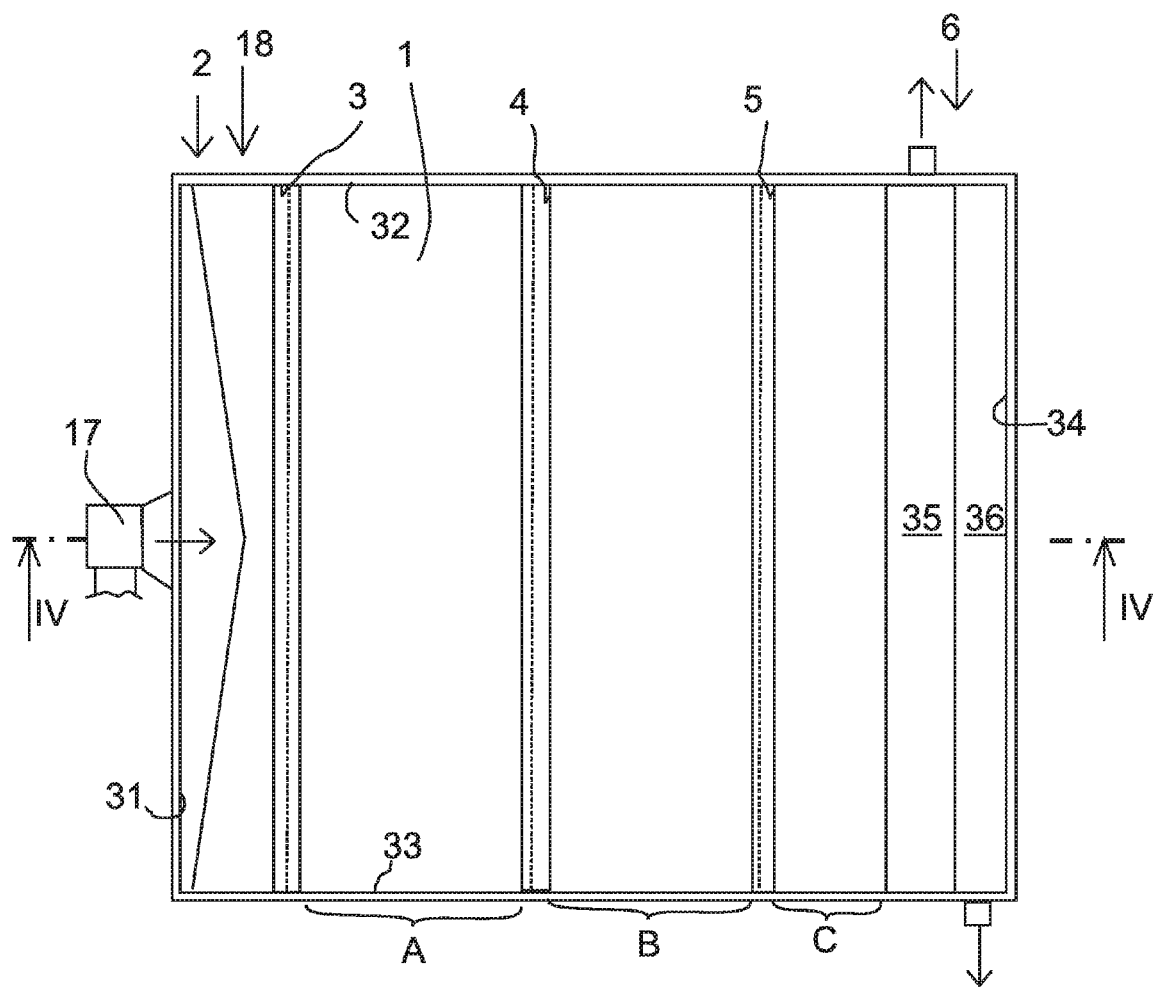
Figure 4:
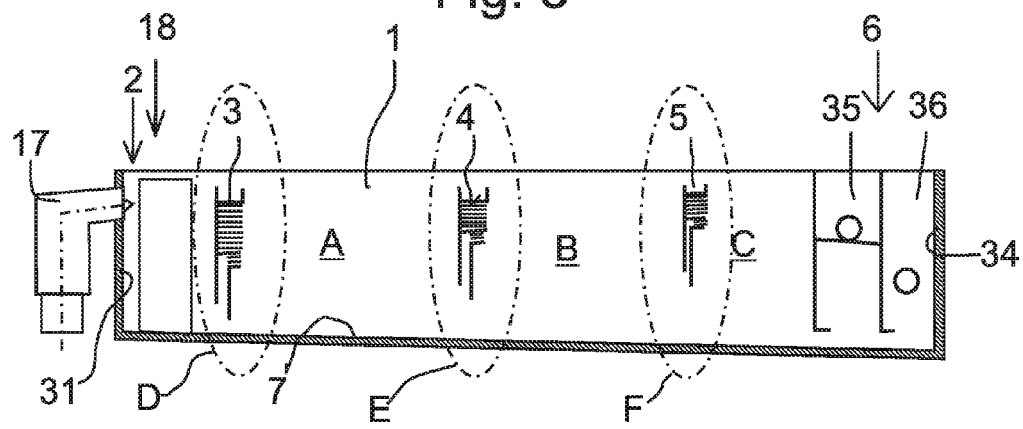
Figure 5:
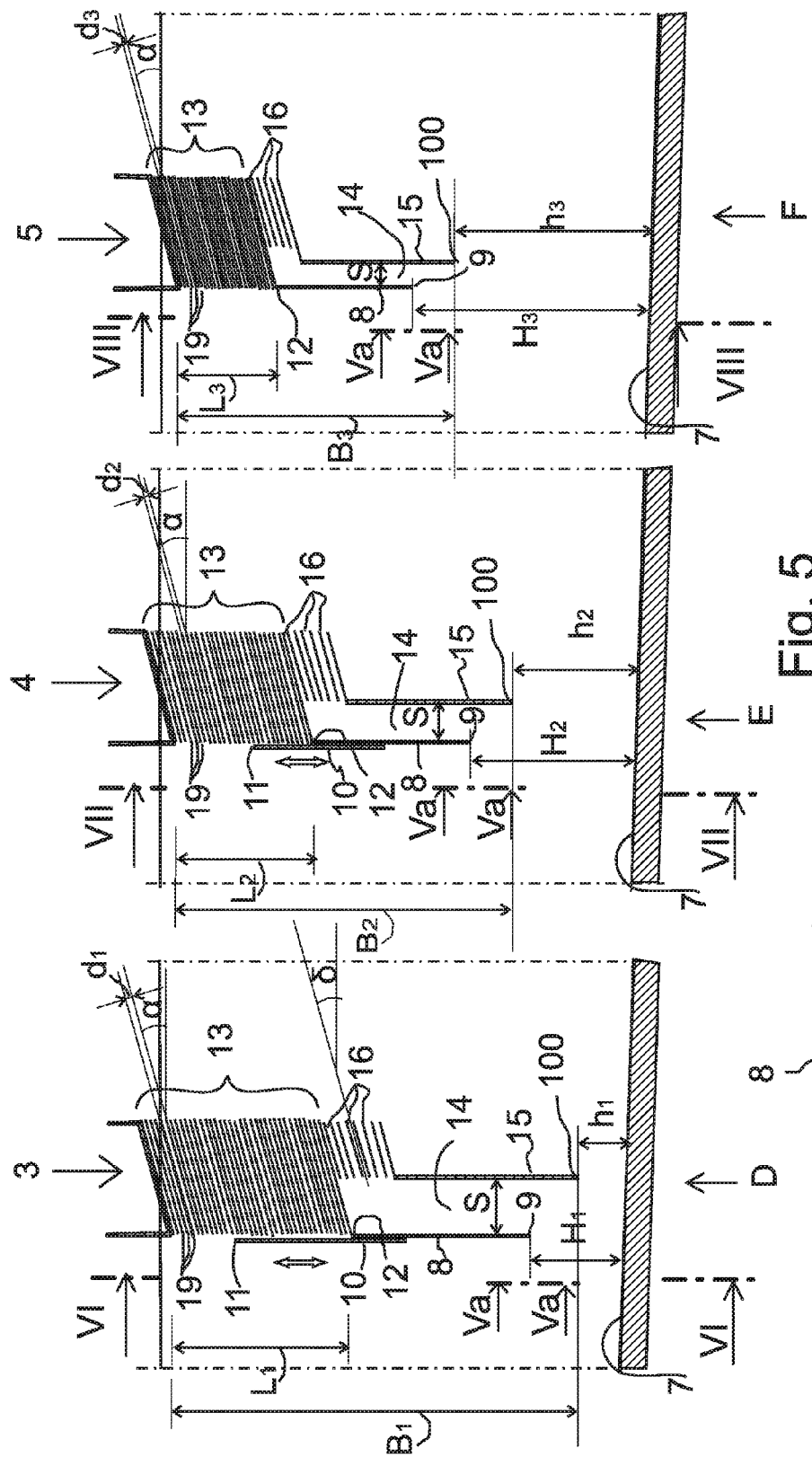
Figure 6:
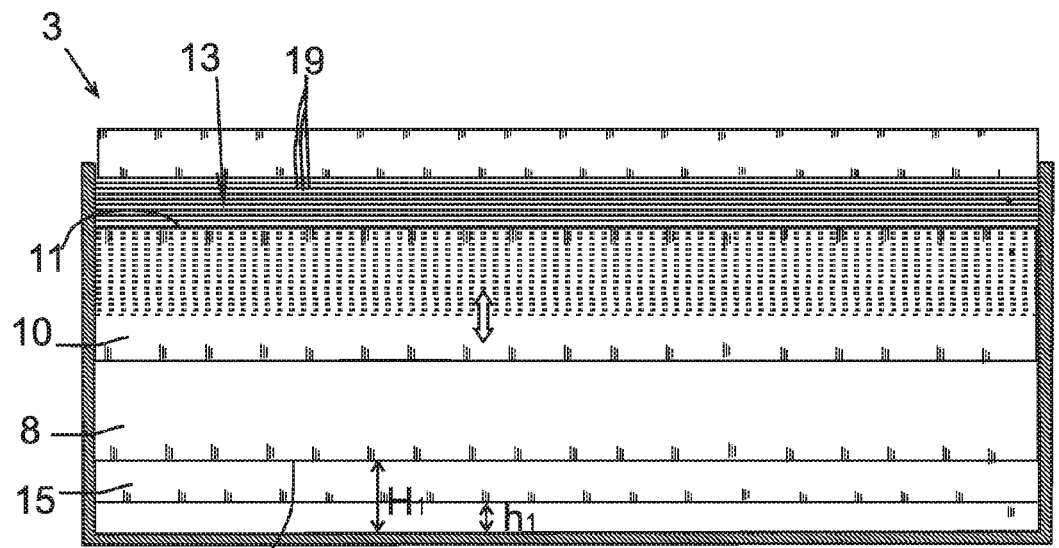
Figure 7:
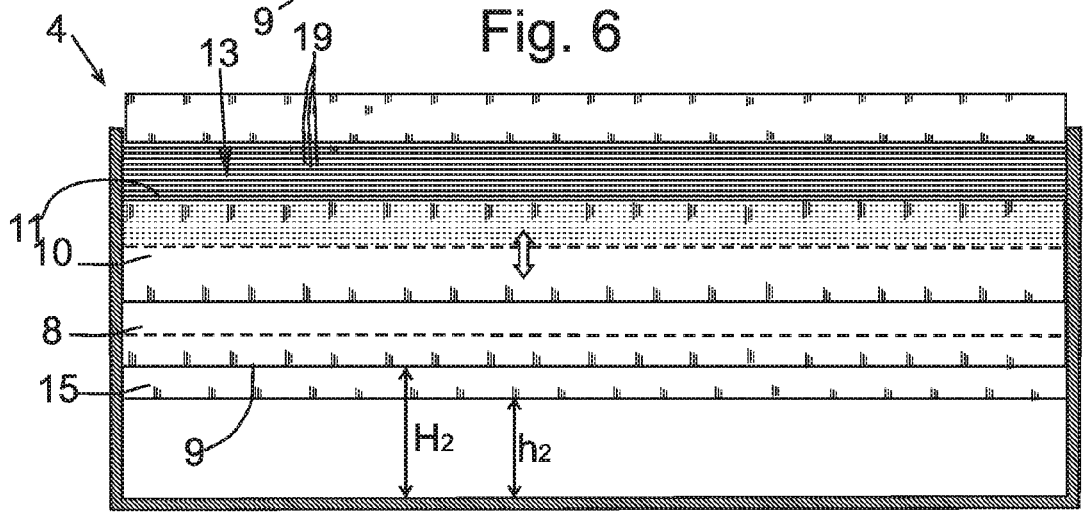
Figure 8:
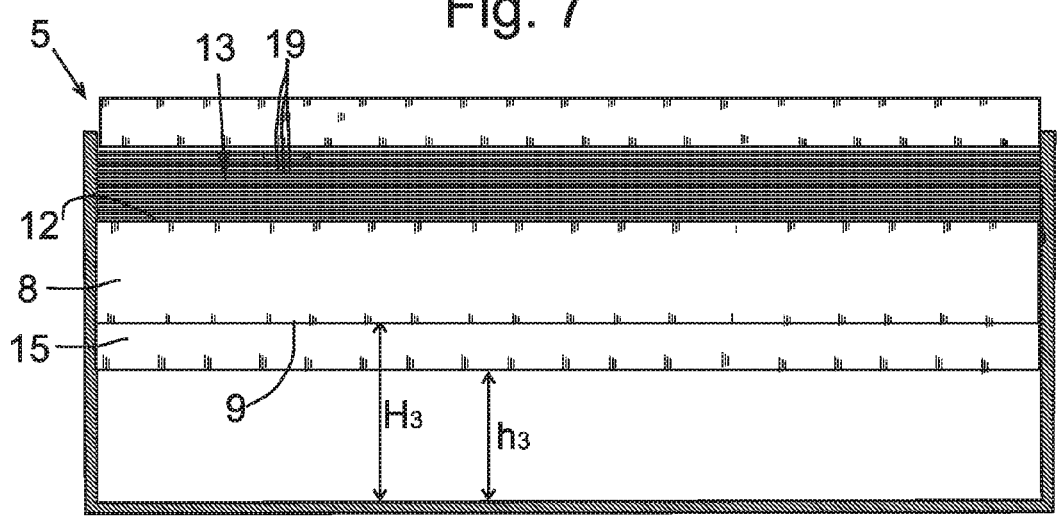

The invention is explained in more detail below, with reference to preferred embodiments and to the appended drawing, where FIG. 1 is a schematical top-view illustration of a first embodiment of a liquid-liquid extraction separation cell provided with an arrangement according to the invention, FIG. 2 illustrates the section II-II in FIG. 1, FIG. 3 is a schematical top-view illustration of a second embodiment of a liquid-liquid extraction separation cell provided with an arrangement according to the invention, FIG. 4 illustrates the section IV-IV of FIG. 3, FIG. 5 illustrates details D, E and F of FIG. 2 or 4, shown as enlarged, FIG. 5a illustrates the bottom edge of the front panels, viewed in the direction Va-Va of FIG. 5, FIG. 6 illustrates the section VI-VI of FIG. 5, FIG. 7 illustrates the section VII-VII of FIG. 5, and FIG. 8 illustrates the section VIII-VIII of FIG. 5.

DETAILED DESCRIPTION OF INVENTION

FIGS. 1 and 2, as well as FIGS. 3 and 4 illustrate a cell arrangement in liquid-liquid extraction. The cell 1 includes an end wall 31 on the side of the cell feed end 2, side walls 32, 33, an end wall 34 at the drain end and a bottom 7, which define between them the separation space (so-called settler).

A dispersion prepared in the mixing space (not illustrated) is fed from a feeder device 17 to a flow distribution device 18, which is located at the feed end 2 of the cell 1. The first and second solutions separated in superimposed phases are arranged to be drained as mutually separated at the drain end 6 that is opposite to the feed end 2 of the cell 1. Shut-off elements 3, 4, 5 are arranged in the cell, in between the feed end and the drain end, to form separator parts A, B, C arranged in succession in the flowing direction, for separating the lighter first solution as an upper solution phase, and for separating the heavier second solution as a lower solution phase. At the drain end 6, there is provided an overflow chute 35, which is positioned transversally with respect to the flowing direction and receives the first solution, separated in the upper phase, as overflow from the cell 1, and from which overflow chute 35 the solution phase is drained. In the flowing direction, after the overflow chute 35 and adjacently with it, there is provided a collecting chute 36 for receiving the second solution as underflow from the cell 1. Riser pipes extend from the collecting chute 36 to the cell, through which riser pipes the second solution can rise to the collecting chute, from where the second solution phase is drained.

As is seen in FIG. 1, the feeder device 17 is arranged so that the dispersion is advantageously fed into the cell 1 at the center of the feed end or in the vicinity thereof. The location of the dispersion supply point at the center of the feed end or in the vicinity thereof is advantageous, but not absolutely necessary.

In the embodiment of FIGS. 1 and 2, there is provided a flow distribution device 18, which advantageously renders an even, sideways proceeding dispersion feed distribution along the whole width of the cell.

In the embodiment of FIGS. 3 and 4, when the flow distribution device 18 employed as the dispersion distribution fence represents the type of V-shaped picket fence described in our patent FI 101200 B, the feed supply is arranged in the middle of that feed end, in the top region thereof, and the supply flow is directed upwardly at a gentle angle.

In the described exemplary embodiments, the number of shut-off elements 3, 4, 5 arranged in the cell and extending along the whole width of the cell is three. In most cases, an advantageous number of shut-off elements ranges from two to four, by which a reliable separation efficiency can be achieved.

The shut-off elements 3, 4, 5 are installed at suitable, preferably varying distances from each other, both at the feed end and the drain end. The first shut-off element 3 must be relatively near to the flow distribution device 18 in order to ensure that a thick dispersion layer is accumulated against the first shut-off element 3, also in rapid cases of liquid-liquid-separation.

The shut-off elements 3, 4 and 5 of the embodiments of FIGS. 1-4 are described in more detail below, with reference to FIG. 5.

From FIG. 5 it is apparent that each shut-off element 3, 4, 5 is provided with a front panel 8 that extends along the whole width of the cell, said front panel 8 including a bottom edge 9, which is arranged at a distance $H_1$, $H_2$, $H_3$ from the cell bottom 7. The front panel 8 allows the heavier solution phase to flow unobstructed directly forwards underneath the bottom edge 9. In the vertical direction, the front panel 8 extends to such a height that it forces the lighter solution phase placed on top of the heavier solution phase to flow as a thin overflow layer over the top edge 12 of the front panel 8, or over the top edge 11 of the adjusting gate 10 that can be shifted in the vertical direction. The adjusting gate 10 provided in the first shut-off element 3 and the second shut-off element 4 is adjustable in the height position, so that the top edge 11 of the adjusting gate defines the overflow height. An adjusting gate is not needed in the third shut-off element 5.

The front panel 8 forces the dispersion to thicken in front of it. The shut-off element 3, 4, 5 further comprises a rear panel 15, which is essentially parallel with the front panel 8 and located at a distance S therefrom. In between the front panel 8 and the rear panel 15, there is formed an uptake shaft 14, extending essentially vertically upwards, along which uptake shaft the thickened dispersion rises upwards and is compressed.

FIG. 5a illustrates an advantageous structure for the bottom edge 9 of the front panel 8. The bottom edge 9 is provided with vertical slots 101 that are spaced apart along the whole width of the front panel 8.

In between the bottom edge 9 of the front panel 8 and the bottom 7, there is left a first distance $H_1$, $H_2$, $H_3$. The bottom edge 100 of the rear panel 15 is placed at a second distance $h_1$, $h_2$, $h_3$ from the bottom 7. In each shut-off element 3, 4, 5, the second distance $h_1$, $h_2$, $h_3$ is shorter than the first distance $H_1$, $H_2$, $H_3$. In each shut-off element 3, 4, 5, the bottom edge 100 of the rear panel 15 is always placed on a lower level than the bottom edge 9 of the front panel 8. The vertical extension $B_1$, $B_2$, $B_3$ of the shut-off elements 3, 4, 5 is reduced in the downstream direction of the flow.

In the direction of the flow, the slanting plates 16 are positioned at an inclined angle δ, inclined with respect to the horizontal plane, and they attenuate and slow down the vertical component of the rising compressed dispersion flow and guide the dispersion essentially in the lengthwise direction of the cell as a dispersion flow to the successive separator part. The angle δ is 5 . . . 30°, preferably 10 . . . 20°. The lighter solution phase flowing over the top edge 12 of the front panel 8, or over the top edge 11 of the adjusting gate 10, as well as part of the dispersion, is cleaned of the residues of the heavier solution phase by means of a sliced sheet separator 13, which is arranged above the top edge 12 of the front panel 8, to extend along the whole width of the cell.

By means of this shut-off element arrangement, the dispersion is allowed to be compressed by droplet binding, which results in an improved dispersion separation, owing to both the capacity and to the mixing levels. The most significant factor in these improvements is the relative increase in the coalescence from droplet to droplet in a densely packed dispersion. In this way, there also is achieved a more equalized breaking up of the continuous phased membranes between the droplets, which means that less droplets are mixed in the separated phase interiors.

With reference to FIGS. 5 and 6-8, the sliced sheet separator 13, which receives the lighter solution phase and/or dispersion conducted as overflow in order to clean it/them, comprises a number of sliced sheets 19, which are positioned, in the direction of the flow, at an inclined angle α that is upwardly inclined with respect to the horizontal plane, and arranged one upon the other at a short mutual distance $d_1$, $d_2$, $d_3$, so that in between the sliced sheets, there are formed narrow laminar flow canals. The angle α is 5 . . . 30°, preferably 10 . . . 20°. The distance between the sliced sheets is $d_1$, $d_2$, $d_3$ is 3 . . . 30 mm.

In the first shut-off element 3, the distance $d_1$ left between the sliced sheets 19 of the sliced sheet separator 13 is 15 . . . 30 mm, in the second shut-off element 4 the distance $d_2$ left between the sliced sheets 19 is 10 . . . 20 mm, and in the third shut-off element 5 the distance $d_3$ left between the sliced sheets 19 is 3 . . . 10 mm.

The vertical extension $L_1$, $L_2$, $L_3$ of the sliced sheet separators 13 of the shut-off elements 3, 4, 5 is reduced in the downstream direction of the flow. The effective solution height in the cell is preferably 1.5 . . . 2.5 m. The height extension $L_1$ of the sliced sheet separator 13 of the first shut-off element 3 is 30 . . . 40% of the cell solution height, the height extension $L_2$ of the sliced sheet separator 13 of the second shut-off element 4 is 25 . . . 35% of the cell solution height, and the height extension $L_3$ of the sliced sheet separator 13 of the third shut-off element 5 is 15 . . . 25% of the cell solution height.

In the first shut-off element 3, the distance $H_1$ of the bottom edge 9 of the front panel 8 from the bottom is 15 . . . 25% of the cell solution height, in the second shut-off element 4 the distance $H_2$ of the bottom edge 9 of the front panel 8 from the bottom 7 is 30 . . . 40% of the cell solution height, and in the third shut-off element 5, the distance $H_3$ of the bottom edge 9 of the front panel 8 from the bottom is 45 . . . 55% of the cell solution height.

Generally the dispersion flow to the sliced sheet separator 13 is minimized by adjusting the adjusting gate 10 so that unseparated dispersion does not get access over its top edge, but all of the dispersion is directed into the uptake shaft 14. This is done by keeping the adjusting gate 10 in the top position, which prevents a direct flow of the dispersion to the separator 13. Now the dispersion can be accumulated sufficiently high in front of the adjusting gate 10 in order to be, as a floating dispersion layer, pressed from underneath the front panel 8 to the uptake shaft 14. This is only possible when the dispersion supply is sufficiently large and surpasses the limit for total dispersion separation in the separation space, in front of the shut-off element. Thus the dispersion strip thicknesses are defined on the basis of the vertical extension and the positions of the adjusting gates of various shut-off elements.

The sliced sheet structure of the separator 13 remarkably speeds up the breaking up of the dispersion owing to its highly laminarized flow, and the turbulence is greatly reduced. The coalescence obtained by the division of the flow, caused by the breaking effect of the sliced sheet 19 and the protuberances of the sheets 19, serving as spacers, can be further increased by a coefficient that is more than 2 . . . 5, depending on the specific features of the liquid-liquid system. This coefficient of increase is higher with a smaller canal height, thus causing the flow to close into a laminar flow. The purpose of the densely spaced sheets in the sliced sheet separator 13 of the last shut-off element 5 is to reduce the degree of A/O-entrainment in a separated organic phase.

As is illustrated in FIGS. 5 and 8, any adjusting gate is not needed in the last shut-off element 5. When the distance $d_3$ between the slanted sliced sheets in the separator 13 is short, the shut-off element is capable of cleaning the separated organic phase of aqueous residues and to accumulate a dispersion in front of it. The vertical extension is so small that the dispersion can proceed into the uptake shaft without the aid of the adjusting gate, in case a sufficient quantity of dispersion is available for an adequate accumulation of the dispersion. However, the situation is different in the first shut-off element 3 and in the second shut-off element, which generally need to be run with the adjusting gate 10 in the high position, for preventing the dispersion from flowing into the separator 13. This is allowed only, when an extremely good dispersion separation capacity must be achieved. Normally there is not allowed any dispersion to flow directly into the separator 13, or only a limited fraction of the dispersion, which is the correct way to make sure that the degree of separation of both separated liquids is reduced near to zero.

As was explained above, an advantageous way to run a liquid phase separation by an arrangement according to the invention is to adjust the adjusting gate 10 placed in front of that sliced sheet separator 13, so that any dispersion is not allowed to enter the separator over the top edge 11 of the adjusting gate, or that only minor fractions of the dispersion are allowed to get access. This is done particularly when separating an organic continuous dispersion, which gives a clean phase dispersion from a compressed dispersion. Thus it is feasible to be able to compressed the dispersion as much as possible in front of the shut-off element, and to allow only the most compressed dispersion to enter the uptake shaft 14, in order to evenly transfer it to the successive separator part. The situation is different when separating a continuous aqueous dispersion, which is lighter or better floating than a corresponding organic dispersion. Therefore a continuous aqueous dispersion is accumulated in a layer that floats on a higher level than a corresponding organic continuous dispersion. Consequently, the adjusting gates must be adjusted on a sufficiently high level for preventing a direct continuous flow into the sliced sheet separator.

However, when a liquid phase separation is run by an arrangement according to the invention in a continuous aqueous dispersion, the adjusting gates 10 must be on purpose adjusted at a height that allows a certain part of the dispersion to flow into the sliced sheet separator 13. In any case, the upper region of the dispersion is mainly composed of an organic phase and of relatively thin membranes of a continuous aqueous phase. This dispersion type is easy to be rapidly and effectively separated in a sliced sheet separator, because it is advantageous to take the correct share of the dispersion directly into the sliced sheet separator.

When running the arrangement with a divided dispersion, where one part flows as underflow via the uptake shaft 14 of the shut-off element 3, 4, 5, and one part flows as overflow to the sliced sheet separator 13, there can be achieved very high feed-through capacities within the range 20 . . . 30 m$^3$/m$^2$h. For most liquid-liquid systems, this is a higher capacity than what can be achieved by using an organic continuous dispersion, with none or only minor division of the dispersion. In the latter case, a feed-through capacity 15 . . . 20 m$^3$/m$^2$h can, however, be achieved for most liquid-liquid systems.

A particularly fast and effective dispersion separation is based on the following features:
thick dispersion layers, the layer thicknesses whereof are defined by the vertical extension of the shut-off element
an increase in the depth of the separation space can be used for increasing the separation capacity
the proceeding of a compressed dispersion to the successive separator part
an even rising flow of the dispersion when the outlet is placed on a suitable level
a sliced sheet separator for the separated organic phase and for a controlled quantity of the dispersion flow
adjusting gates in front of the sliced sheet separator for controlling the division of the dispersion
a flow control specific to the dispersion continuity
an individual structure of the separator units and distances therebetween In the embodiment of FIG. 5, the front panel 8 and the rear panel 15 are vertical.

Generally the separation space includes 1-4 shut-off elements, which means that depending on the case, the separation capacity is set within the range 10 m$^3$/m$^2$h . . . 20 m$^3$/m$^2$h, at the same time as the organic residual droplets in water are set between 1 ppm and ppm, and that aqueous residual droplets in the organic solution are set between 0 ppm and 30 ppm.

An 1 effective solution depth in the cell 1 is 1.5 . . . 2.5 m, which means that a significant classification in the dispersion layer of the first separation space has ample time to take place. When the aqueous solution is in a droplet phase, the droplets are accumulated in a dense grouping in the lower part of that dispersion layer, where the ratio between the volumes of the aqueous solution and the organic solution is set within the range 3 . . . 9, depending on the case that is being run. The uptake shaft 14 leading to the separation space following the dispersion is designed to have such measures in width that the predicted quantity of dispersion rising therein does not raise the flow rate over the region 0.05 m/s . . . 0.10 m/s. In this way it is possible to prevent the compressed droplet grouping from becoming essentially less compressed, and to make sure that the prerequisite of the present invention for a fast and nearly complete separation of the solution phases is not lost.

The invention is not restricted to the above described embodiments only, but many modifications are possible within the scope of the inventive idea defined in the claims.

The invention claimed is:

1. An arrangement capable of separating two solutions mixed in dispersion into two solution phases in a liquid-liquid extraction separation cell, said arrangement including:
    a feeder device capable of feeding dispersion to a feed end of the cell,
    a flow distribution device which is placed in the vicinity of the feed end and is capable of distributing the supplied dispersion evenly along the whole width of the cell, and
    a shut-off element that divides the cell in the lengthwise direction into separator compartments characterized in that the shut-off element includes:
    a front panel that extends along the whole width of the cell, said front panel including a bottom edge arranged at a distance from the cell bottom, so that the front panel allows an unobstructed flow of the heavier solution phase directly forwards underneath the bottom edge, which front panel extends in the vertical direction to such a height that it forces the lighter solution phase placed on top of the heavier solution phase to flow as a thin overflow layer over a top edge of the front panel and forces the dispersion to thicken in front of the front panel,
    a rear panel, which is essentially parallel with the front panel and placed at a distance therefrom, so that in between the front panel and the rear panel, there is formed an essentially vertically upwards extending uptake shaft, along which uptake shaft the thickened dispersion can rise upwards and be compressed,
    at least one slanting plate forming an outlet of said uptake shaft, said outlet proximate the top of said uptake shaft and guiding the dispersion to flow in a substantially lengthwise direction of the cell to the successive separator compartment, each said at least one slanting plate oriented at an upwardly inclined angle ($\delta$) relative to the direction of the flow so as to allow the dispersion to rise, as it flows across each said at least one slanting plate, in a limited manner,
    a sliced sheet separator arranged above the top edge of the front panel and extending along the whole width of the cell, said sliced sheet separator arranged to receive at least one of the lighter solution phase and dispersion conducted as overflow for cleaning, and
    an adjusting gate capable of adjusting the amount of the dispersion to be conducted as overflow to the sliced sheet separator, said adjusting gate placed in front of the front panel and extending along the cell width, said adjusting gate having an adjustable height so that a top edge of the adjusting gate defines the overflow height.

2. An arrangement according to claim 1, characterized in that the sliced sheet separator includes a number of sliced sheets, which are placed in the direction of the flow at an inclined angle ($\alpha$), inclined upwardly with respect to the horizontal plane, and arranged one upon the other, spaced apart at a distance, so that in between the sliced sheets, there are formed narrow laminar flow canals.

3. An arrangement according to claim 2, characterized in that at leas one of the angle ($\alpha$) and the angle ($\delta$) is within the range of 5-30°.

4. An arrangement according to claim 2, characterized in that the distance between the sliced sheets is 3-30 mm.

5. An arrangement according to claim 1, characterized in that the arrangement includes at least one shut-off element which divides the cell in the lengthwise direction into separator compartments with different lengths.

6. An arrangement according to claim 5, characterized in that the arrangement includes first, second and third shut-off elements.

7. An arrangement according to claim 6, characterized in that in the first shut-off element, the distance between the sliced sheets is 15-30 mm, in the second shut-off element the distance between the sliced sheets is 10-20 mm, and in the third shut-off element the distance between the sliced sheets is 3-10 mm.

8. An arrangement according to claim 1 having a plurality of shutoff elements, each shutoff element having a respectively different magnitude vertical extension relative to the others of said plurality of shutoff elements, and said plurality of shutoff elements arranged with respect to each other such that their respective vertical extensions diminish in magnitude along the downstream direction of the flow.

9. An arrangement according to claim 5 having a plurality of shutoff elements, each shutoff element having a respectively different magnitude vertical extension relative to the others of said plurality of shutoff elements, and said plurality of shutoff elements arranged with respect to each other such that their respective vertical extensions diminish in magnitude along the downstream direction of the flow.

10. An arrangement according to claim 1, characterized in that while the distance between the bottom edge of the front panel and the cell bottom is a first distance, the bottom edge of the rear panel is placed at a second distance from the cell bottom, said second distance being shorter than the first distance.

11. An arrangement according to claim 1, characterized in that the front panel and the rear panel are essentially vertical.

12. An arrangement according to claim 1, characterized in that the width of the uptake shaft is arranged so that the dispersion quantity rising therein does not raise the flow rate up to more than 0.05 m/s-0.10 m/s.

13. An arrangement according to claim 1, characterized in that an effective solution height in the cell is 1.5-2.5 m.

\* \* \* \* \*

UNITED STATES PATENT AND TRADEMARK OFFICE
CERTIFICATE OF CORRECTION

Page 1 of 1

PATENT NO.        : 9,010,548 B2
APPLICATION NO.   : 13/145334
DATED             : April 21, 2015
INVENTOR(S)       : Nyman et al.

It is certified that error appears in the above-identified patent and that said Letters Patent is hereby corrected as shown below:

In the Claims

Claim 3, Column 11, at line 4: change "at leas" to -- at least --

Signed and Sealed this
Fourth Day of August, 2015

Michelle K. Lee
*Director of the United States Patent and Trademark Office*